Figure 1:
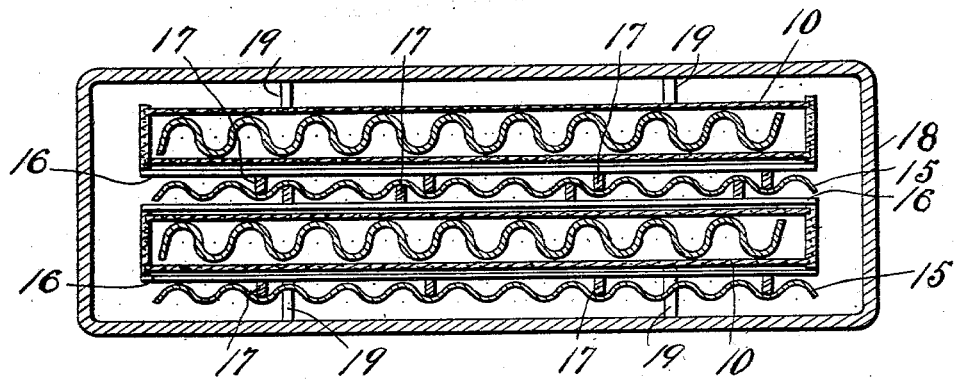

No. 745,588. PATENTED DEC. 1, 1903.
H. B. FORD.
ELECTROLYTIC APPARATUS.
APPLICATION FILED MAY 11, 1903.
NO MODEL.

Witnesses
Chas. K. Davis
Wm. B. Herham

Inventor
Henry B. Ford
by Mauro Cameron & Lewis
Attorneys

No. 745,588. Patented December 1, 1903.

UNITED STATES PATENT OFFICE.

HENRY B. FORD, OF NEW YORK, N. Y., ASSIGNOR TO SWAN ELECTRIC MANUFACTURING COMPANY.

ELECTROLYTIC APPARATUS.

SPECIFICATION forming part of Letters Patent No. 745,588, dated December 1, 1903.

Application filed May 11, 1903. Serial No. 156,666. (No model.)

*To all whom it may concern:*

Be it known that I, HENRY B. FORD, whose post-office address is No. 64 Lind avenue, Highbridge, borough of the Bronx, New York city, New York, have invented a new and useful Improvement in Electrolytic Apparatus, which is fully set forth in the following specification.

This invention relates to electrolytic apparatus in which a highly-electropositive metal—such, for example, as zinc, sodium, or cadmium—is deposited upon an electrode immersed in the electrolyte. The principal application which is contemplated for the present invention is the construction of secondary batteries. In the electrolytic deposition of such metals it is customary to employ an electrode consisting partly of mercury, which is used in order to form an amalgam with the deposited metal, the supporting part of the plate being usually of copper or other metal which is a good electrical conductor and has an affinity for mercury. It has been proposed heretofore to construct secondary batteries upon this principle, using zinc as the soluble electropositive metal, and theoretically such batteries have a high efficiency and other advantageous properties. In practice, however, it has been found that the mercury at each successive operation of dissolving and depositing has a tendency to work downward, finally leaving the vertical surfaces of the negative-pole electrode nearly destitute of mercury. Various expedients for overcoming this difficulty have been proposed. (See United States Letters Patent to Charles J. Reed Nos. 719,870, 719,872, and 719,873, dated February 3, 1903.) It has also been proposed to avoid the difficulties incident to vertical plates by arranging the electrodes horizontally; but this expedient has been found to introduce such serious disadvantage that it has not been successful commercially. (See United States Letters Patent to William Main No. 401,289, dated April 9, 1889, and No. 485,013, dated October 25, 1892, the latter showing the return to the vertical arrangement.)

According to the present invention means are provided for overcoming the difficulties above referred to, and it is also the object of the invention to produce a battery of relatively great capacity as well as of high electromotive force. The accomplishment of the latter object is effected by providing for the production at each charge of a large quantity of mercury sponge, while at the same time insuring the electrical contact thereof with the conducting-support of the cathode. To this end each hydrogen element or negative-pole electrode is inclosed in a thin porous cup (which may be made of wood or other suitable material) extending practically to the top of the cell and containing, primarily, a sufficient quantity of mercury to fill or nearly fill the cup when expanded or swollen into the sponge condition by the absorption of hydrogen. The conducting part of the element is formed of a thin plate of suitable metal, copper being best adapted to the purposes of a secondary battery, and to this plate is applied a plate or surface coating of the electropositive metal, such as zinc. In the preferred form this layer of zinc is primarily applied to the copper support, and it is also preferred to apply a zinc plate on each side of the copper plate, so that the latter is completely inclosed.

Another useful feature of construction is the corrugation in a vertical direction of the combined zinc and copper plate, which increases the conductive surface and adds to the strength of the element without impeding the ascent of the mercury sponge as it expands to fill the cell.

Another feature of the invention consists in supporting the negative-pole electrodes with their porous cups at a certain distance above the bottom of the containing vessel, leaving a space in which the material shed from the oxygen elements accumulates, and in providing the conductive supports of the oxygen elements with lugs or extensions projecting downwardly into this space, so that advantage may be taken of the action of this shed material. These positive-pole electrodes or oxygen elements may be of any known and suitable description, such as lead supports, with active material in the form of peroxid of lead. Good results have been obtained by the use of plates of copper or other conductive material with applied peroxid of manganese.

In a battery constructed as above described the initial charging-current causes the mercury to act upon the zinc and copper plates in the usual way and also forms by the absorption of hydrogen a mercury sponge containing also some zinc, which expands upwardly until (if the proportions be correct) the porous cup is practically filled. In the discharge of the battery there is double action of the oxygen upon the zinc and upon the absorbed hydrogen, respectively. The action upon the hydrogen is first completed, resulting in the disappearance of the sponge. So long as the latter remains the voltage is about 2.5. Upon its disappearance the electromotive force drops to about 1.5 volts.

The accompanying drawings illustrate one mode of practically embodying the principle of the invention, which, however, is not limited to the details of construction employed therein.

Figure 2:
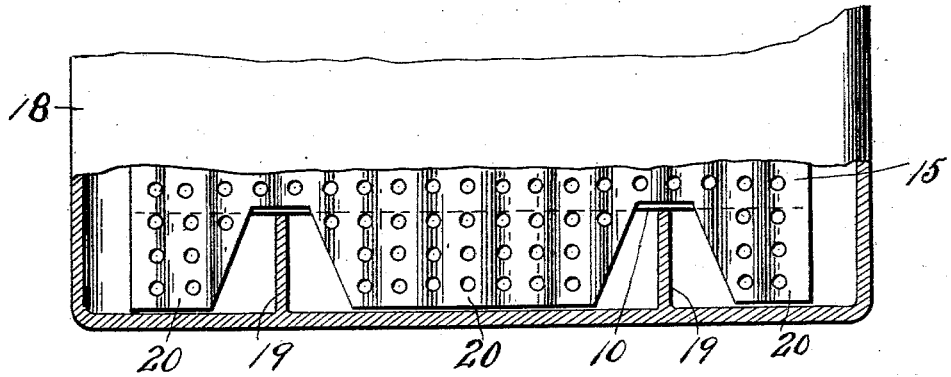
Figure 3:
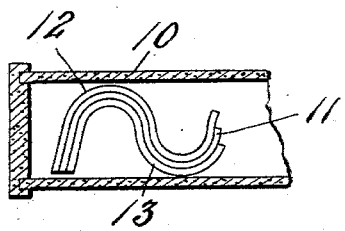

Figure 1 is a horizontal section of a cell constructed according to the invention, only two positive and two negative elements being shown. Fig. 2 is an elevation of the lower part of the cell, the casing being broken away. Fig. 3 is a detail view, on an enlarged scale, of part of the negative-pole electrode.

The construction of the negative-pole electrode or hydrogen element will first be described.

Each negative-pole electrode is inclosed in a porous cup or vessel 10, which may be made of wood for the sake of cheapness and lightness. The conducting-plate 11, of copper, is inclosed between two zinc plates 12 and 13, Fig. 3, all three plates being corrugated vertically, the depth of the corrugations being substantially equal to the internal width of the cup 10. In this cup is placed, primarily, a suitable quantity of mercury. Proportions, of course, are not essential; but for the sake of illustration it may be stated that, assuming the internal dimensions of the cup to be eight by five and one-half inches and the thickness of the three sheets of zinc and copper to be one-twentieth of an inch, five ounces of mercury will form upon a full charge a quantity of sponge sufficient to practically fill the cup. This sponge is too soft to adhere to the plate, but is retained in contact therewith by the walls of the cup. If an amalgam hard enough to be retained in grooves or pockets were used, much hydrogen would be lost.

The positive-pole electrode or oxygen element is composed of a perforated and corrugated supporting-plate 15, which may be of lead with mechanically-applied peroxid of lead or of copper with peroxid of manganese or of any of the known materials used for this element.

Between each positive and negative element is a separating-frame, composed of horizontal strips 16 and vertical strips 17, which frame permits the free circulation of the electrolyte.

The battery vessel 18 is provided with a support, consisting in this instance of two cross-pieces 19, which sustain the negative-pole electrodes a short distance above the bottom of the vessel. The particles of active material detached from the positive-pole electrodes accumulate in this space, and the positive-pole electrodes have downwardly-extending lugs 20, which project into this space, so that such detached material may have conducting-surfaces in contact therewith. With such a battery dilute sulfuric acid—say of 25° Baumé—may be used as an electrolyte.

Details of construction may of course be modified within wide limits without departing from the spirit of the invention.

Having now fully described the said invention, what is claimed as new is—

1. In an electrolytic apparatus, a negative-pole electrode comprising a plate of conducting material, such as copper, inclosed in a porous cup containing also mercury and a highly-electropositive metal.

2. In a secondary battery, a negative-pole electrode comprising a conducting-support, such as copper, and an adherent plate of electropositive metal, such as zinc, inclosed in a porous cup containing mercury.

3. In an electrolytic apparatus such as a secondary battery, a negative-pole electrode comprising a supporting-plate of conducting material corrugated vertically, a zinc coating or layer primarily applied thereto and also corrugated, a porous cup inclosing the same, and mercury contained in said cup.

4. In a secondary battery, a hydrogen element comprising a copper conducting-support inclosed between two sheets or layers of zinc, and inclosed in a porous cup containing mercury.

5. In a secondary battery, a negative-pole electrode comprising a thin sheet of conducting material inclosed between sheets or layers of a highly-electropositive metal, the compound plate being corrugated vertically, and inclosed in a porous cup containing mercury.

6. In a secondary battery, a negative-pole electrode comprising a copper support with zinc and mercury inclosed in a porous cup, and a positive-pole electrode composed of a copper support with applied peroxid of manganese.

7. In a secondary battery, hydrogen elements composed each of a conducting-support with zinc and mercury, supported with their lower edges above the bottom of the battery vessel, and oxygen elements having tongues or projections extending into the space beneath the hydrogen elements.

In testimony whereof I have signed this specification in the presence of two subscribing witnesses.

HENRY B. FORD.

Witnesses:
PHILIP MAURO,
R. L. SCOTT.